US009235603B2

(12) United States Patent
Hao et al.

(10) Patent No.: US 9,235,603 B2
(45) Date of Patent: Jan. 12, 2016

(54) ACTIVITY BASED SEARCH

(75) Inventors: Jack Jianxiu Hao, Lexington, MA (US);
Zhiying Jin, Lexington, MA (US);
Martin Busse, Woburn, MA (US);
Jimena Velarde, Arlington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 189 days.

(21) Appl. No.: 13/431,294

(22) Filed: Mar. 27, 2012

(65) Prior Publication Data

US 2013/0262439 A1 Oct. 3, 2013

(51) Int. Cl.
*G06F 7/00* (2006.01)
*G06F 17/30* (2006.01)

(52) U.S. Cl.
CPC ...... *G06F 17/30265* (2013.01); *G06F 17/3064* (2013.01); *G06F 17/30616* (2013.01)

(58) Field of Classification Search
CPC .............. G06F 17/30864; G06F 17/30; G06F 17/30011; G06F 17/30613
USPC .......................... 707/603, 705–788, 821–831
See application file for complete search history.

(56) References Cited

U.S. PATENT DOCUMENTS

| 6,701,314 | B1 * | 3/2004 | Conover et al. | 707/740 |
| 2003/0226146 | A1 * | 12/2003 | Thurston et al. | 725/46 |
| 2005/0027670 | A1 * | 2/2005 | Petropoulos | 707/1 |
| 2008/0021874 | A1 * | 1/2008 | Dahl et al. | 707/3 |
| 2012/0150903 | A1 * | 6/2012 | Davis et al. | 707/769 |
| 2013/0031107 | A1 * | 1/2013 | Pan et al. | 707/749 |
| 2013/0054688 | A1 * | 2/2013 | Rourke et al. | 709/204 |
| 2013/0226930 | A1 * | 8/2013 | Arngren et al. | 707/741 |

* cited by examiner

*Primary Examiner* — Taelor Kim

(57) ABSTRACT

A method includes identifying at least one document associated with content from at least one digital content source. The at least one document includes information identifying at least one aspect of the content. The method also includes determining a document index for the at least one document based on keywords included in the at least one document. An activity field is inserted into the document index. The method includes accessing activity information. The activity information identifies at least one activity keyword associated with at least one activity. The method further includes identifying at least one present activity keyword in the document based on the activity information. An indicator of at least one present activity is determined based on the at least one present activity keyword. The method includes indexing the indicator of the at least one present activity in the activity field of the document index.

20 Claims, 8 Drawing Sheets

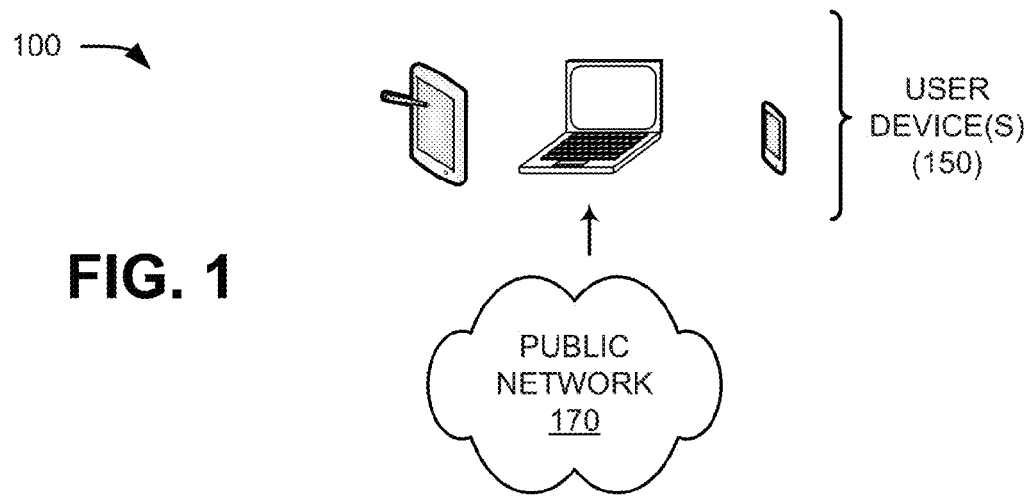
FIG. 1
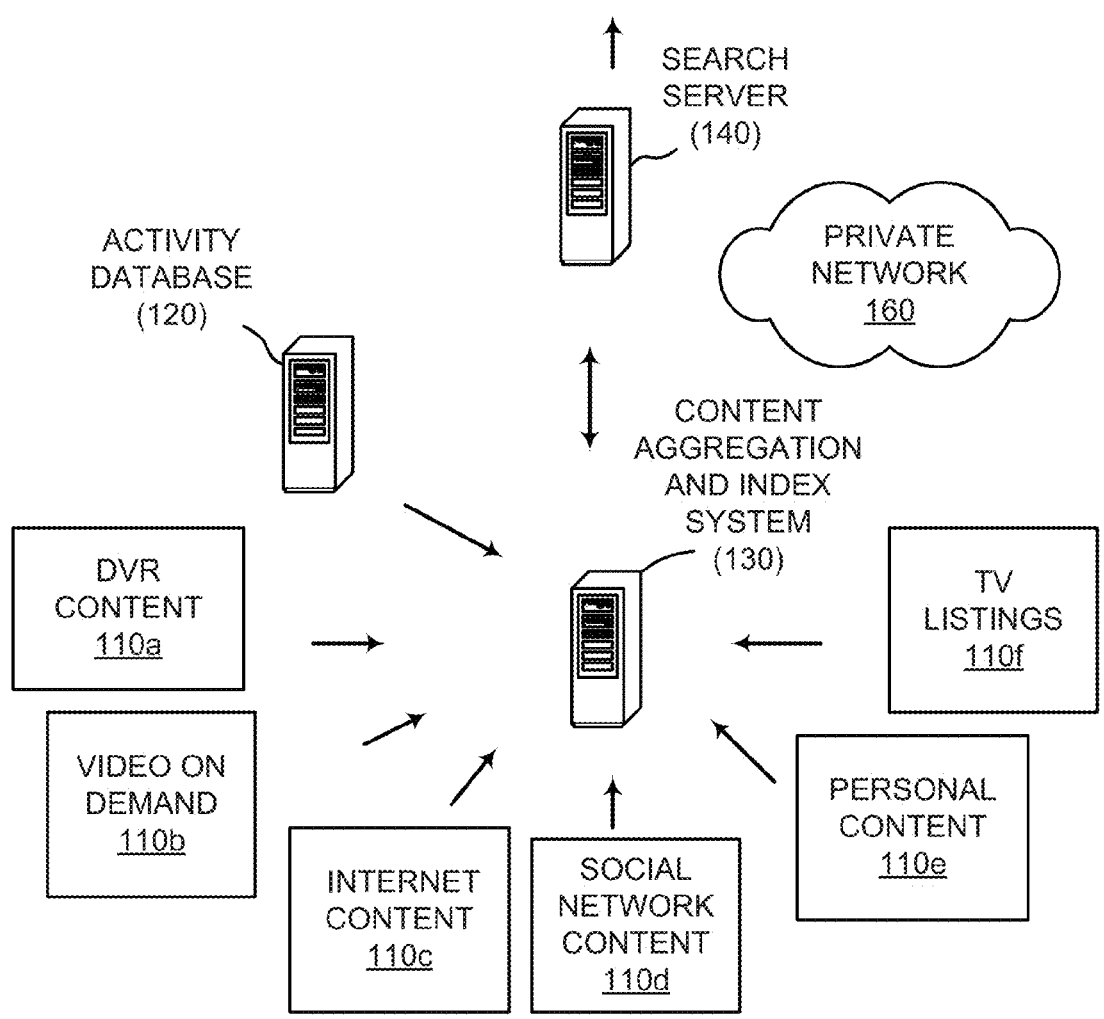

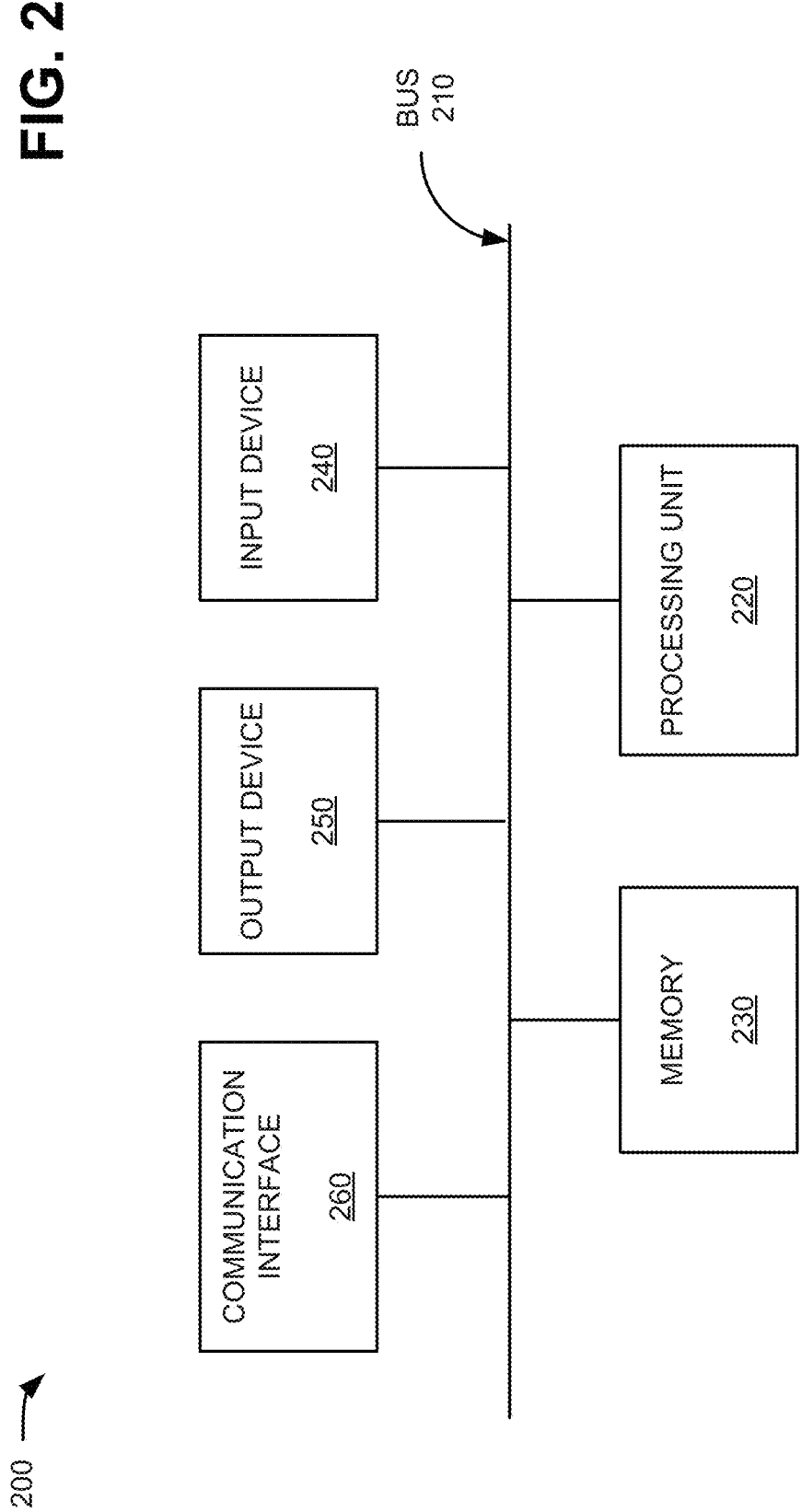

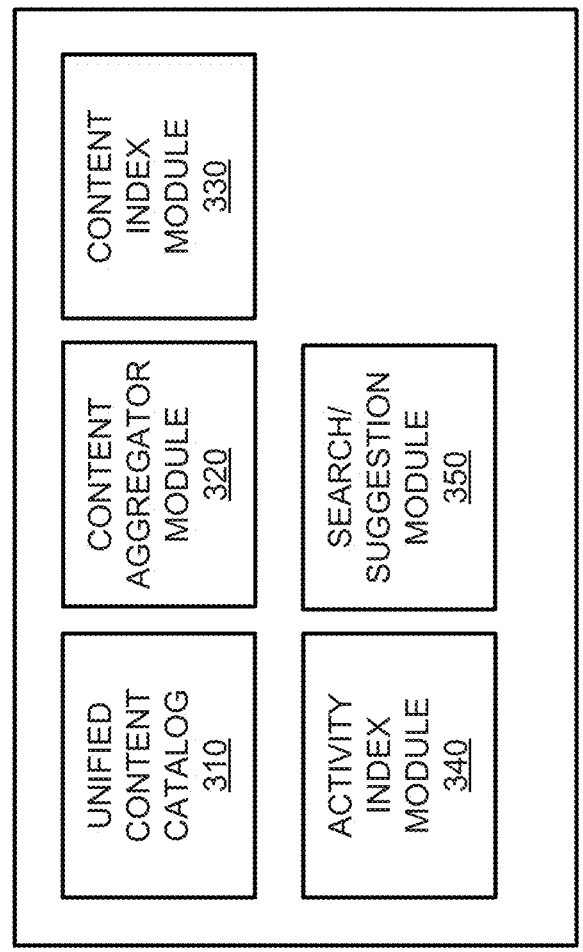

400

| | ACTIVITY | ACTIVITY CODE | ACTIVITY DESCRIPTION | ACTIVITY KEYWORD |
|---|---|---|---|---|
| 402a | BASEBALL | 02 | BASEBALL ACTIVITY | RBI, MLB, FENWAY, BUNT |
| 402b | ACTION MOVIE | 07 | ACTION MOVIE SESSION | POPCORN, BREAKNECK |
| 402c | SWIMMING | 13 | SWIMMING | LAPS, DIVE, FREESTYLE |
| 402d | RODEO | 15 | RODEO EVENT | STEER, BUCK, LASSO |
| 402e | COMMUTE | 16 | LOCAL TRAVEL | TRIP, ROAD, ETA, TRAFFIC |
| 402f | NEW YEARS EVE | 21 | NEW YEARS EVE EVENT | NYC, CELEBRATION |

| | DOCUMENT TITLE | ACTIVITY CODE | ACTIVITY KEYWORD | BOOSTING FACTOR |
|---|---|---|---|---|
| 452a | PLAYOFFS | 02 | RBI | 10 |
| 452b | MLB REPORT | 02 | MLB, RBI | 20 |
| 452c | UMPIRE STRIKE | 02 | FENWAY, MLB | 20 |
| 452d | TRIALS TODAY | 13 | LAPS | 100 |
| 452e | ANOTHER RECORD! | 13 | DIVE | 50 |

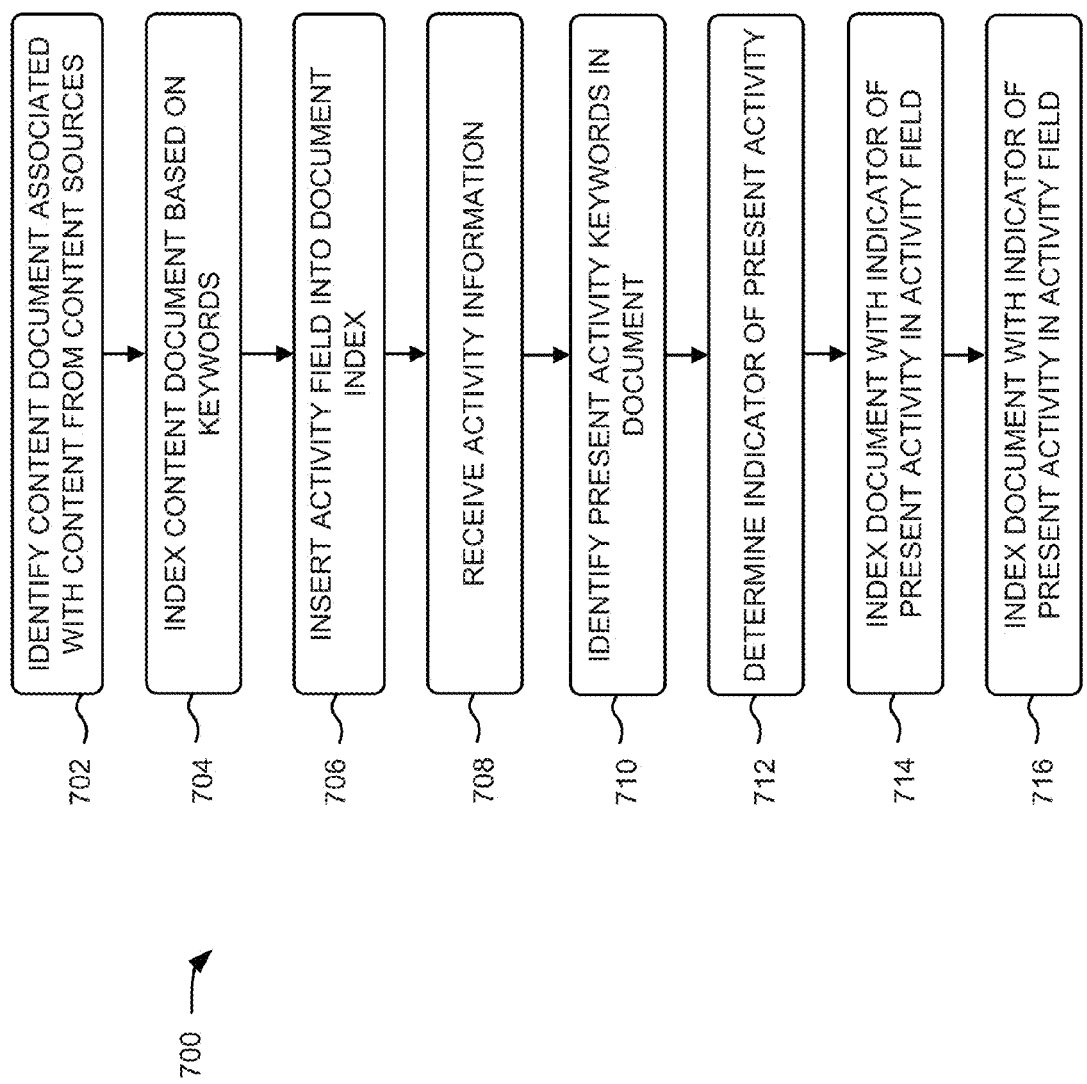

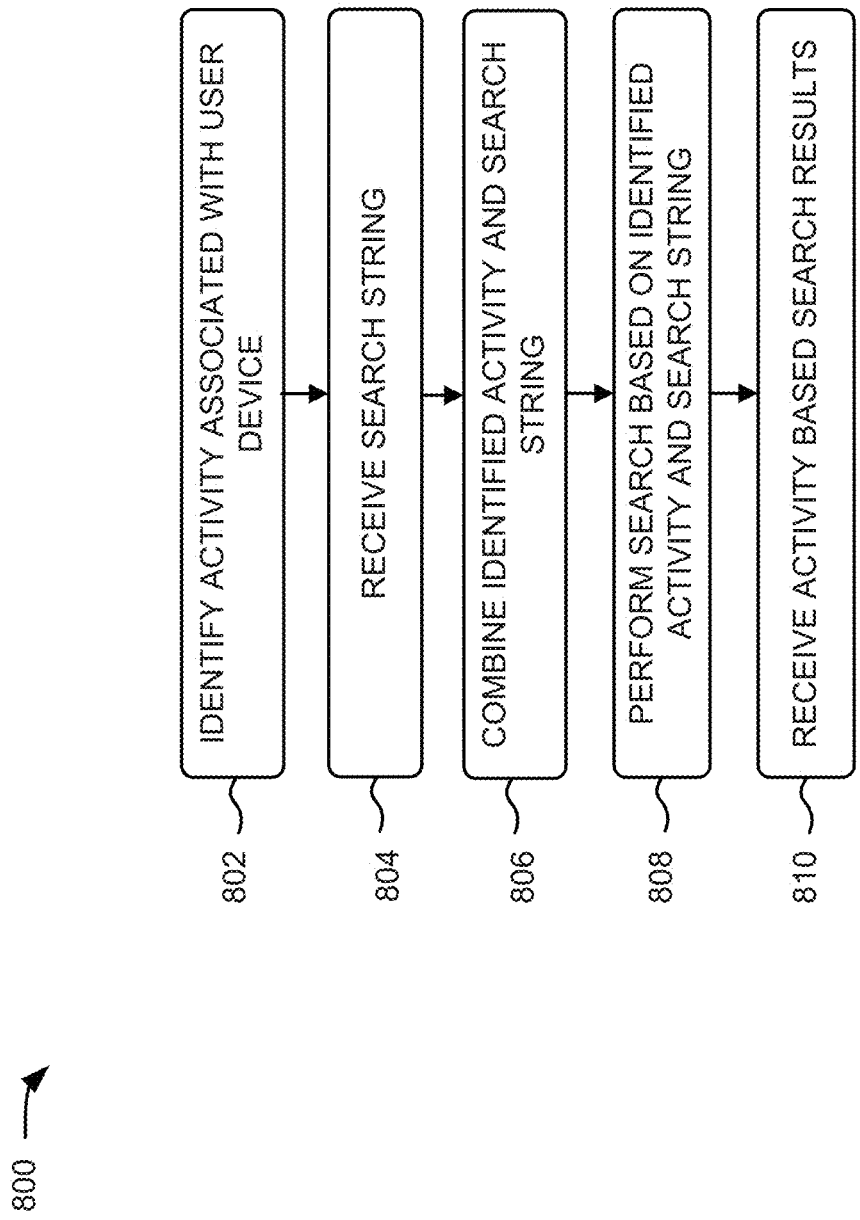

ACTIVITY BASED SEARCH

BACKGROUND

Users type search words, also known as keywords, into a user interface when searching for items related to the search words. After a list of results is returned, the user may choose an item from the result list, and detailed information for that item may be provided. The detailed information is also known as a document. The document may be provided based on an event, and may include a time, date, places as well as other information for the event. Alternatively, the document may be based on multimedia content, such as films, and may include a title, description, directors, list of actors, poster art, show times, and trailers.

BRIEF DESCRIPTION OF THE DRAWINGS

FIG. 1 is an exemplary network in which systems and/or methods described herein may be implemented;

FIG. 2 is a block diagram of exemplary components of a device that may correspond to one or more of the devices of FIG. 1;

FIG. 3 is a diagram of exemplary functional components of the content aggregation and index system of FIG. 1;

FIG. 4A is an exemplary table of activities stored or received by the activity index module of FIG. 3;

FIG. 4B is an exemplary activity based search index generated by the activity index module of FIG. 3;

FIG. 7 is a flow chart of an exemplary process for indexing content sources based on associated activities; and FIG. 8 is a flow chart of an exemplary process for searching for an item based on an activity according to an implementation described herein.

DETAILED DESCRIPTION OF PREFERRED EMBODIMENTS

Figure 5:
FIG. 5 shows exemplary functional components of a user device of FIG. 1.

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide activity based search of content, including multimedia items. The activity based search may be executed on a unified content catalog that includes information on content from live television (TV), video on demand (VOD), digital video recordings (DVR), premium and personal content/files, social network sites, and other cataloged internet sources. The unified content catalog may also include information on local personal content. Relevancy of content to the activity based search may be determined based on a detected current activity of a user, such as traveling, athletics, etc., and/or on an activity selected by the user. The unified content catalog may be indexed by adding activity tags according to properties of each content item.

FIG. 1 is an exemplary network 100 in which systems and/or methods described herein may be implemented. As illustrated, network 100 may include a plurality of content sources 110a-110f (collectively referred to as content sources 110 or individually as content source 110). Content sources 110a-110f include digital video recorder (DVR) content 110a, video on demand (VOD) 110b, Internet content 110c, social network content 110d, personal content 110e, and television (TV) listings 110f. As further shown, network 100 may also include an activity database 120, a content aggregation and index system 130, a search server 140, user devices 150, a private network 160, and a public network 170. The particular arrangement and number of components of network 100 shown in FIG. 1 are illustrated for simplicity. In practice there may be more content sources 110a-110f, activity databases 120, content aggregation and index systems 130, search servers 140, user devices 150, private networks 160, and/or public networks 170. Components of network 100 may be connected via wired and/or wireless links.

Content sources 110 may provide a plurality of different video and multimedia content, as well as audio, pictures, and other content that may be indexed and accessed by user devices 150 in network 100. Each content item may include an associated content document that identifies aspects of the content. For example, the content document may include searchable identifying information, such as a time, date, a place, a title, a description, a director, a list of actors, poster art, show times, and trailers.

DVR content 110a may include movies and other television programs that may have been recorded by a user to one or more associated DVRs. VOD 110b may include content that may be consumed on an "on demand" basis. Each of DVR content 110a and VOD 110b may include a title, a description, a director, a list of actors, as well as a price and availability of particular programs. Internet content 110c may include website content and multimedia content. Social network content 110d may include content from social networking websites and other social networking applications. Personal content 110e may include home movies, digital picture, etc., that may have been automatically and/or manually entered, and associated information. TV listings 110f may include listings of TV programs and corresponding times at which the user may tune in or DVR each program.

Activity database 120 may include information ("activity information") for one or more activities. The activity information may be used to identify instances of keywords corresponding to particular activities in documents or data, such as content documents based on content available from content sources 110 described below with respect to FIG. 4A. An activity may include an action or related series of actions. For example, an activity may include traveling, swimming, baseball, football, tennis, exercising, video-gaming, sight-seeing, shopping, event viewing, and commuting. Activity database 120 may include activity information that may be used to identify particular activities associated with content items. The activity information may include a compendium of terms, phrases and other information related to the activity. For example, if the activity is swimming, the activity information may include terms on a related action (e.g., diving), a synonym (e.g., wading), a technique (e.g., breaststroke), an associated measure (100 meters), a related entity (e.g., Olympic swimmer), a related event (swim meet), or a location (aquatic center). Additionally, activities database 120 may include detection information that may identify some activities performed by a user. Such activities may be detected in association with user device 150, as described with respect to FIG. 8 and process 800 below.

Content aggregation and index system 130 may aggregate and index content from one or more content sources 110 as described below with respect to FIG. 3. For example, content aggregation and index system 130 may receive content documents and other digital content metadata, such as lists or categories of content, from content sources 110. Content aggregation and index system 130 may use the content metadata to provide currently-available content options to user devices 150 via search server 140.

Search server 140 may provide a user interface to enable a user to search the content indexed by content aggregation and index system 130 based on keywords entered by the user. Search server 140 may also allow the user to search content documents associated with content sources 110 based on activities associated with user device 150. The activities may be entered by the user via an activity field in the user interface or may be detected in association with user device 150. Search server 140 may provide content suggestions or recommendations based on the activities entered/detected in association with user device 150. For example, search server 140 may recommend particular content to the user based on an user activity and based on user search terms, a user profile, a user viewing history, or previously purchased content.

User device 150 may enable a user to view video content. User device 150 may also enable the user to interact with another user device 150 or a video display device (e.g., a set-top box and/or television). User device 150 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices. In one implementation, user device 150 may include a client-side application that enables user device 150 to communicate with, for example, search server 140 and/or present information received from search server 140 to a user. The client-side application may permit a user of user device 150 to log into an account, access catalog information (e.g., from content aggregation and index system 130), submit an order, and/or consume live streaming video content (e.g., from content sources 110). In another implementation, user device 150 may include a client-side application that enables user device 150 to determine an activity of a user associated with user device 150. User device 150 is further described w below with reference to FIG. 5.

Private network 160 may include, for example, one or more private IP networks that use a private IP address space. Private network 160 may include a local area network (LAN), an intranet, a private wide area network (WAN), etc. In one implementation, private network 160 may implement one or more Virtual Private Networks (VPNs) for providing communication between, for example, activity database 120, content aggregation and index system 130, search server 140, and/or user devices 150. Private network 160 may be protected/separated from other networks, such as public network 170, by a firewall. Although shown as a single element in FIG. 1, private network 160 may include a number of separate networks.

Public network 170 may include a local area network (LAN), a wide area network (WAN), such as a cellular network, a satellite network, a fiber optic network, a private WAN, or a combination of the Internet and a private WAN, etc. that are used to transport data. Although shown as a single element in FIG. 1, public network 170 may include a number of separate networks that provide services to user devices 150.

In implementations described herein, an activity based search may be provided for a unified content catalog that includes information about content from TV, VOD, DVR, premium and personal content/files, social network sites, and other cataloged internet sources. The activity based search may be provided for an indexed sub section of the unified content catalog that includes content documents related to a particular activity. Relevancy of the content items to a particular search may be based on a current user activity.

FIG. 2 is a diagram of exemplary components of a device 200 that may correspond to devices implementing content sources 110, activity database 120, content aggregation and index system 130, search server 140, or user device 150. Each of content sources 110, activity database 120, content aggregation and index system 130, search server 140, and user device 150 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 250. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, input device 240 and/or output device 250 may not be implemented in device 200. In these situations, device 200 may be a "headless" device that does not explicitly include an input or an output device. Alternatively, or additionally, one or more components of device 200 may perform one or more other tasks described as being performed by one or more other components of device 200.

FIG. 3 is a diagram of exemplary functional components of content aggregation and index system 130. In one implementation, the functions described in connection with FIG. 3 may be performed by one or more components of device 200 (FIG. 2). As shown in FIG. 3, content aggregation and index system 130 may include a unified content catalog 310, a content aggregator module 320, a content index module 330, an activity index module 340, and a search/suggestion module 350. Although unified content catalog 310 is described with respect to content aggregation and index system 130, unified content catalog 310 may be implemented in other parts of network 100. Additionally, content aggregation and index system 130 may be implemented to provide other types of catalogs in network 100. The particular arrangement and number of components in content aggregation and index system 130 as shown in FIG. 3 are illustrated for simplicity.

Unified content catalog 310 includes a catalog of content from content sources 110 that are accessible by a user via network 100 (FIG. 1). In one implementation, unified content catalog 310 may be aggregated from content sources 110 and updated at periodic intervals and/or whenever particular content is added to particular content sources.

Content aggregator module 320 may aggregate information, from content sources 110, related to particular content (e.g., a program or video). In one implementation, content aggregator module 320 may provide links or other menu options to enable a user to select related content provided by content sources 110. In one implementation, content aggregator module 320 may also temporarily cache some content locally for performance purposes. Content aggregator module 320 may also aggregate content from different content sources 110 according to requests from user devices 150.

Content index module 330 may index content from content sources 110 based on keywords included in or associated with a content document for each content item. The keyword may be in a title, a description or other parts of the content document. Content index module 330 may also index the content based on search keywords not appearing in the original content document, such as synonyms or related words for keywords or subjects associated with the document. Content index module 330 may add associated keywords to the indexing associated with content sources 110. For example, content index module 330 may add "Fenway" to an index for a Major League Baseball (MLB) or baseball document(s) that is searched for and/or accessed in association with a Boston or New England location.

Activity index module 330 may store and/or receive a table of activities 400, as shown with respect to FIG. 4A, for example from activity database 120. Table of activities 400 may include, for each activity 402, corresponding activity codes 404, activity descriptions 406, and activity keywords 408. An activity code 404 may be an alphanumeric code corresponding to an activity. An activity description 406 may summarize the type, scope or coverage of a particular activity. For example, activity description 406 may include a descriptor that restricts the scope of activities searched, such as "professional", "international", "American", etc. Activity keywords 408 are keywords that identify a particular activity. Activity keywords 408 may include a word, a group of words, or a phrase that indicates the occurrence of data/information, on a particular activity. in a document.

As further shown in FIG. 4A, activity 402a, which is baseball, may have an activity code 404, which is 02, an activity description 406, which is baseball activity, and one or more activity keywords 408a, which are runs batted in (RBI), MLB, Fenway, bunt, etc. Similarly, activity 402b, which is action movie (e.g., viewing an action movie), may have an activity code 404, which is 07, an activity description 406, which is action movie (viewing) session, and activity keywords 408b, which are popcorn, breakneck, etc. Activity 402c, which is swimming, may have an activity code 404, which is 13, an activity description 406, which is swimming, and activity keywords 408c, which are laps, dive, freestyle, etc. Activity 402d, which is rodeo (e.g., attending a rodeo event), may have an activity code 404, which is 15, an activity description 406, which is rodeo event, and activity keywords 408d, which are steer, buck, lasso, etc. Activity 402e, which is commuting, may have an activity code 404, which is 16, an activity description 406, which is local travel, and activity keywords 408e, which are trip, road, estimated time of arrival (ETA), traffic, etc. Activity 402f, which is New Year's Eve, may have an activity code 404, which is 21, an activity description 406, which is New Year's Eve event, and activity keywords 408f, which are New York City (NYC), celebration, Times Square, etc.

Activity index module 330 may index documents associated with content from content sources 110 under a particular activity code 404 based on activity keywords 408 included in or associated with a content document or a file for each content item from content sources 110. Activity index module 330 may index a particular content document based on the incidence of activity keywords 408, for a particular activity, in the content document. For example, if the activity is New year's Eve, activity index module 330 may index content documents that include associated activity keywords 408, such as NYC, celebration, Times Square, and additional activity keywords 408 associated with New Year's Eve 402f, such as "New Year", "New Year Eve", "celebration event", "city travel", "New Year celebration", "visiting New York", etc.

Activity index module 330 may also index content based on activity indicators associated with or included in the content documents. An activity indicator may be a tag that is applied by users to the content/documents (e.g., a favorite activities tag for social media, documents bookmarked under "my favorite traveling places" for websites, etc.). In one implementation, the activity indicator may be the corresponding activity code 404 for the particular activity.

FIG. 4B is an activity based search index 450 generated by activity index module 340. Search index 450 may include index for the content documents based on content available from content sources 110. Search index 450 may include a document title 452 for each content document, as well as activity codes 404, activity keywords 408, and an activity boosting factor 454 associated with the activity keywords 408. Document titles 452 may refer to particular content that is available from content sources 110. For example, document title 452a, which is "Playoffs", may refer to streaming video content, indicated in TV listings 110f, that is available from a content provider.

Activity boosting factors 454 may provide a boosting factor for particular keywords that are included in a particular search. Activity boosting factors 454 may increase a weight of the relevancy of a document found from a search based on activity keyword 408 (e.g., user inputs keywords for the activity). For example, content documents that contain a searched for activity keyword 408, such as "RBI" may be boosted by a factor based on the occurrence of the single activity keyword 408 (e.g., a factor of 10), while content documents that contain multiple activity keywords 408 may be boosted by a factor based on the combination of activity keywords (e.g., an additional factor of 2 for additional activity keywords would produce a boosting factor of 20). Results based on search strings that include an activity keyword 408 may be increased in relevance based on the activity boosting factor.

Search/suggestion module 350 may provide suggestions to user device 150 via search server 140. Search/suggestion module 350 may provide results ranked based on the frequency and position that an activity keyword 408 appears in a document. For example, content documents with keywords (or activity keywords 408) that appear in the title of the content document may be ranked higher than content documents that have the same activity keyword 408 in another portion of the content document (e.g., a description section). If the activity keyword 408 is "big waves" (for an activity of surfing) and "big waves" is included in the title of a first content document and "big waves" is included in the description of a second content document, the first content document may have a higher ranking (i.e., is more relevant) than the second content document when a user searches for content associated with the activity of surfing.

FIG. 5 is a diagram of example functional components of user device 150. In one implementation, the functions described in connection with FIG. 5 may be performed by one or more components of device 200 (FIG. 2). As shown in FIG. 5, user device 150 may include a video application client 510, an activity detection client 520 and a DRM agent 530. The particular arrangement and number of components of user device 150 are shown in FIG. 5 for simplicity.

Video application client 510 may include hardware or a combination of hardware and software that may enable user device 150 to interface with search server 140 and other devices in network 100 to access content from content sources 110 via content aggregation and index system 130. In one implementation, video application client 510 may be stored temporarily (e.g., in memory 230) on user device 150. Video application client 510 may provide a search interface, such as described with respect to FIG. 6 and search interface 600 below, which allows a user to search for content from content aggregation and index system 130 based on an activity associated with the user. In one implementation, video application client 510 may search content aggregation and index system 130 for content based on keywords and/or activity keywords 408. Alternatively, video application client 510 may request a list of content available for downloading and may present the list of content to a user. Video application client 510 may include an interactive client interface that allows a user to provide inputs such as user passwords, preferences, search words, activity indicators, and selections from the list of available content.

Activity detection client 520 may include hardware or a combination of hardware and software that may detect an activity in association with a user of user device 150. Activity detection client 520 may detect the activity based an activity identifier associated with the user and/or user device 150. The activity identifier may indicate that a particular activity, such as an event, a sport, a game, a recreational activity, a collaborative activity, a scheduled activity, or a regularly executed activity is currently associated with the user and/or user device 150. For example, the activity identifier may include an action or group of actions associated with an activity, a global positioning system (GPS) location of user device 150 (e.g., presence at a tennis court may indicate the user is playing tennis), a motion of user device 150 (e.g., motion along a highway may indicate that the user is traveling), additional devices currently accessed by the user of user device 150 (e.g., an active oven may indicate that the user may be cooking), additional entities currently associated with the user of user device 150, applications accessed by the user (e.g., a video-gaming application may indicate that the user is playing a video game), a motion of the user (e.g., a running motion may indicate that the user is running), a pattern of usage of user device 150 by the user (e.g. a user may access particular applications, websites, etc., in conjunction with particular activities), a status of the user (e.g., on "leisure time", or on "business time"), a calendar or schedule associated with the user (e.g., a user may note that a particular activity is scheduled for a particular time in their calendar), a previous pattern of behavior of the user, etc.

User device 150 may include (or be associated with) an activity sensor (not shown) that may detect a current activity of the user. For example, the activity sensor may detect the current activity of the user based on different factors, such as a GPS location of user device 150, a present mode of user device 150 (e.g., "game mode", "travel companion mode", etc.). In another example, activity detection client 520 may be associated with a motion detector that may identify a particular motion (or series or group of motions) with a particular activity.

DRM agent 530 may include hardware or a combination of hardware and software that may retrieve security information (e.g., decryption keys) to access protected content received from content aggregation and index system 130 or associated devices. For example, DRM agent 530 may communicate with video application client 510 to identify selected content and coordinate the receipt of DRM security information with the protected content from content aggregation and index system 130. Protected content may include, for example, content encrypted to enforce copyright restrictions.

Figure 6:
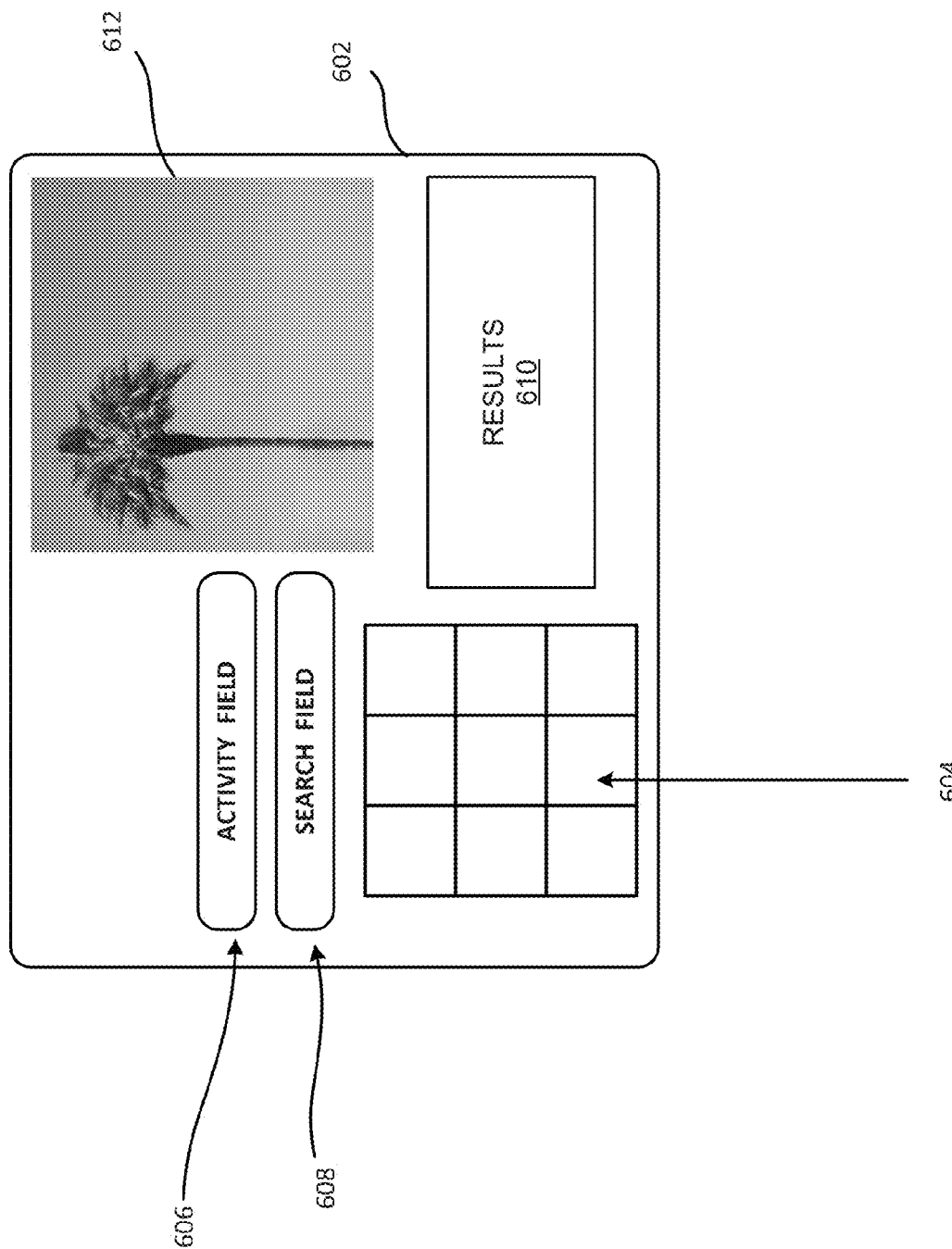
FIG. 6 is an exemplary user activity search interface implemented on the user device FIG. 1.

FIG. 6 is a diagram of a user interface 600. FIG. 6 shows a user interface 600, for instance of user device 150, with a display 602, an alphanumeric keypad 604 (soft keys), an activity field 606, a search field 608, results listing 610 and a content window 612. The particular arrangement and number of components of user interface 600 shown in FIG. 6 are illustrated for simplicity.

Referring to FIG. 6, a user may enter a search string using alphanumeric keypad 604 into search field 604. The search string may include keyword that correlates to content that may be provided by content sources 110. User device 150 may transmit the search string to search server 140. The user may also indicate an associated activity, which may be displayed in activity field 606, for instance as described with respect to FIG. 8 and process 800.

Search server 140 may return a list of results that may be displayed in results list 610. For example, while the user types the search string in search field 604, results may be shown in results list 610 for the user to choose. Once the user chooses one of the search results, details of that particular content item may be shown.

FIG. 7 is a flow chart of an exemplary process for indexing content sources based on associated activities according to implementations described herein. Process 700 is described with respect to tables 400 and 450, shown in FIGS. 4A, and 4B, respectively. In one implementation, process 700 may be performed by content aggregation and index system 130. In another implementation, some or all of process 700 may be performed by another device or group of devices, including or excluding content aggregation and index system 130.

As shown in FIG. 7, content aggregation and index system 130 may identify content documents associated with content from content sources 110 (block 702). For example, content aggregation and index system 130 may aggregate content documents based on content sources 110. Content aggregation and index system 130 may identify a location (e.g., Internet protocol (IP) address, digital folder location, etc.) where the content may be accessed. In some implementations, content aggregation and index system 130 may store (for example, in an associated memory) content that may also be provided by content sources 110.

Content aggregation and index system 130 may index the content documents based on keywords included in, or associated with, the content documents (block 704). For example, content aggregation and index system 130 may identify content documents that include a particular keyword and the position of the keyword in the document, such as in a title of the content document, in the body of the content document, etc. Content aggregation and index system 130 may optimize the data indexing so that the processed data files for the content documents are substantially optimized for search engine consumption, e.g., by search server 140 (i.e., the data files may be arranged for rapid data retrieval). Content aggregation and index system 130 may also incorporate relevancy information, boosting factors etc., so that search server 140 may sort and output the results in a relevant sequence to user device 150.

At block 706, content aggregation and index system 130 may insert an activity field into the document index for the content document. For example, content aggregation and index system 130 may introduce and/or indicate an activity field in the document index. For example, content aggregation and index system 130 may include an extra field in an index for each content document.

At block 708, content aggregation and index system 130 may access activity information. For example, content aggregation and index system 130 may receive activity information from activity database 120. The activity information may include activity keywords 408 (e.g., terms, phrases etc.) that identify where in each content document (or whether) a particular activity is described or identified. The activity information may also include corresponding activity code 404 for each activity. The activity information may describe multiple activities, with each activity being identified by particular activity keywords 408. For example, the activity information may include subgroups of activity keywords 408 for each identifiable activity.

Content aggregation and index system 130 may determine present activity keywords 408 identified in the document based on the activity information (block 710). For example, content aggregation and index system 130 may search each document for occurrences of present activity keywords 408, associated with each activity, in the document and identify the present activity (or activities) identified in each document based on occurrences of activity keyword 408.

At block 712, content aggregation and index system 130 may determine an indicator of the present activity. For example, content aggregation and index system 130 may identify an activity code 404, and corresponding present activity, associated with the present activity keywords 408.

Content aggregation and index system 130 may index content documents with the indicator of the present activity in the activity field (block 714). For example, content aggregation and index system 130 may input activity code 404 corresponding to the present activity of the user in the activity field, based on corresponding activity keywords 408.

Content aggregation and index system 130 may provide a current document index (or a current update to a previous document index) to search server 140 (block 716). The current document index includes content documents indexed for keywords and activities, such as shown in FIG. 4B (in that instance activity keywords 408). Content aggregation and index system 130 may provide the current document index to search server 140 based on a predetermined schedule or based on demand. The predetermined schedule may include a predetermined interval and/or a predetermined threshold of updated index entries. Once search server 140 receives the current document index (e.g., in a data update), search server 140 may validate the current document index to ensure that the current document index meets predefined data quality standards (i.e., the data is suitable for search consumption). Once search server 140 validates the current document index, the previous document index may be backed up and replaced by the current document index. In case the current document index is corrupt or otherwise unusable, search server 140 may roll back to the previous document index.

FIG. 8 is a flowchart of an exemplary process for searching for an item based on an activity according to implementations described herein. In one implementation, process 800 may be performed by search server 140 in conjunction with user device 150. In another implementation, some or all of process 800 may be performed by another device or group of devices, including or excluding search server 140 and user device 150.

As shown in FIG. 8, user device 150 may identify an activity that is currently associated with user device 150 (block 802) or a user of user device 150. For example, user device 150 may receive an indication of an activity that is input in association with user device 150 or the user of user device 150 (e.g., using a profile associated with the user). The relevance of searches associated with the user entity may be based on the activity currently associated with the user/user device 150.

According to one embodiment, the user may input an activity, for instance by clicking on an activity tag (not shown), or inputting the activity in activity field 606, in user interface 600 of user device 150 (as shown in FIG. 6). The activity tag or activity field 606 may identify the activity associated with search of content sources 110.

According to another embodiment, user device 150 may include a client application that monitors and identifies the user's activity. For example, user device 150 may identify an activity based on a GPS location (or a rate of change in GPS location). User device 150 may identify that the user is traveling away from a home location based on the GPS information.

User device 150 may receive a search string (block 804). For example, the user may enter the search string in search field 608 of user device 150. The search string may be a keyword, such as "Boston", or a combination of keywords.

User device 150 may combine the search string and information about the identified activity (block 806). For example, an identified term for the activity (e.g., "traveling") may be combined with the search keyword "Boston."

At block 808, user device 150, in conjunction with search server 140, may perform a search based on the identified activity and the search string. For example, user device 150 may transfer the combined identified activity and the search string to search server 140. Search server 140 may search unified content catalog 310 associated with content sources 110 using an activity based search that includes the information on the activity and the search string. The search procedure may be executed on content documents that are indexed with the particular activity. The search procedure may provide documents that are relevant to a particular activity while avoiding documents that are not relevant to the activity. For example, if the activity is rodeo, a search for "knot" may return content documents that refer to knots in the context of a rodeo and may exclude knots that are not related to the "rodeo" activity, such as a Boy Scout program, nautical guide, etc.

User device 150 may receive the results of an activity based search (810). The activity based search results may include document identified and sorted based on the identified activity and the search string. For example, the search results may include documents associated with an activity code that corresponds to the identified activity and that include the search string. The documents may be ranked based on relevancy and also based on the occurrence of activity keywords 408 and keywords from the search string in portions of the document.

Systems and/or methods described herein may allow indexing of content from content sources based on identified activities in the content. The activity indexed content is a subset of available content in which occurrences of an activity have been identified. The activity indexed content may be searched based on activities and search terms. The activity indexed content may substantially reduce an amount of content (or content documents) that a search process is required to search and thereby increase a speed of the search.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 7 and FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
identifying at least one document associated with content from at least one digital content source, wherein the at least one document includes information identifying at least one aspect of the content;
determining a document index for the at least one document based on keywords included in the at least one document;
inserting an activity field into the document index, wherein each entry of the activity field is required to list at least one activity associated with the at least one document and an activity includes at least one action performed by a user;
accessing activity information, wherein the activity information identifies at least one activity keyword associated with at least one activity;
identifying at least one present activity keyword in the at least one document based on the activity information;
determining at least one indicator of at least one present activity based on the at least one present activity keyword;
indexing the at least one indicator of the at least one present activity in the activity field of the document index;
receiving an activity identifier and a search string from a user device, wherein the user device generates the activity identifier based on an activity detected by the user device; and
providing a search result to the user device based on the search string of documents that match the activity identifier and the at least one indicator of the at least one present activity.

2. The computer-implemented method of claim 1, wherein accessing the activity information further comprises:
accessing at least one activity set, wherein each of the at least one activity set includes information about an activity, a corresponding indicator of the activity, and at least one corresponding activity keyword.

3. The computer-implemented method of claim 1, further comprising:
providing an activity boosting factor in the document index, wherein search results based on search strings including at least one activity keyword associated with a present activity are increased in relevance based on the activity boosting factor.

4. The computer-implemented method of claim 1, further comprising:
providing the document index to a search server on a predetermined schedule, wherein the predetermined schedule is based on at least one of a predetermined interval and a predetermined threshold of updated index entries.

5. The computer-implemented method of claim 1, wherein identifying the at least one present activity in the at least one document based on the activity information further comprises:
identifying an activity keyword associated with the at least one present activity in the at least one document.

6. The computer-implemented method of claim 1, wherein accessing the activity information further comprises:
determining a related action of the present activity, a synonym of the present activity, a variation of the present activity, a related entity of the present activity, or a location associated with the present activity.

7. The computer-implemented method of claim 1, wherein identifying at least one present activity in the at least one document comprises identifying at least one of traveling, swimming, baseball, football, tennis, exercising, video-gaming, sight-seeing, shopping, event viewing, or commuting.

8. A device, comprising:
a memory to store a plurality of instructions; and
a processor configured to execute instructions in the memory to:
identify at least one document associated with content from at least one digital content source, wherein the at least one document includes information identifying at least one aspect of the content;
determine a document index for the at least one document based on keywords included in the at least one document;
insert an activity field into the document index, wherein each entry of the activity field is required to list at least one activity associated with the at least one document and an activity includes at least one action performed by a user;

access activity information, wherein the activity information identifies at least one activity keyword associated with at least one activity;

identify at least one present activity keyword in the at least one document based on the activity information;

determine at least one indicator of at least one present activity based on the at least one present activity keyword;

index the indicator of the at least one present activity in the activity field of the document index;

receive an activity identifier and a search string from a user device, wherein the user device generates the activity identifier based on an activity detected by the user device; and provide search results to the user device based on the search string of documents that match the activity identifier and the at least one indicator of the at least one present activity.

9. The device of claim 8, wherein the activity information includes at least one activity set, wherein each of the at least one activity set includes information about an activity, a corresponding indicator of the activity, and at least one corresponding activity keyword.

10. A non-transitory computer-readable medium including instructions to be executed by a processor, the instructions including one or more instructions, which when executed by the processor, for causing the processor to:

identify at least one document associated with content from at least one digital content source, wherein the at least one document includes information identifying at least one aspect of the content;

determine a document index for the at least one document based on keywords included in the at least one document;

insert an activity field into the document index, wherein each entry of the activity field is required to list at least one activity associated with the at least one document and an activity includes at least one action performed by a user;

access activity information, wherein the activity information identifies at least one activity keyword associated with at least one activity;

identify at least one present activity keyword in the at least one document based on the activity information;

determine at least one indicator of at least one present activity based on the at least one present activity keyword;

index the indicator of the at least one present activity in the activity field of the document index;

receive an activity identifier and a search string from a user device, wherein the user device generates the activity identifier based on an activity detected by the user device; and provide a search result to the user device based on the search string of documents that match the activity identifier and the at least one indicator of the at least one present activity.

11. The non-transitory computer-readable medium of claim 10, wherein, when accessing the activity information, the one or more instructions further includes instructions to:

access at least one activity set, wherein each of the at least one activity set includes information about an activity, a corresponding indicator of the activity, and at least one corresponding activity keyword.

12. The non-transitory computer-readable medium of claim 10, wherein the one or more instructions further includes instructions to:

provide an activity boosting factor in the document index, wherein search results based on search strings including at least one activity keyword associated with a present activity are increased in relevance based on the activity boosting factor.

13. The non-transitory computer-readable medium of claim 10, wherein the one or more instructions further includes instructions to:

provide the document index to a search server on a predetermined schedule, wherein the predetermined schedule is based on at least one of a predetermined interval and a predetermined threshold of updated index entries.

14. The non-transitory computer-readable medium of claim 10, wherein, when identifying the at least one present activity in the at least one document based on the activity information, the one or more instructions further includes instructions to:

identify an activity keyword associated with the at least one present activity in the at least one document.

15. The non-transitory computer-readable medium of claim 10, wherein, when accessing the activity information, the one or more instructions further includes instructions to:

determine a related action of the present activity, a synonym of the present activity, a variation of the present activity, a related entity of the present activity, or a location associated with the present activity.

16. The non-transitory computer-readable medium of claim 10, wherein, when identifying at least one present activity in the at least one document, the one or more instructions further includes instructions to:

identify at least one of traveling, swimming, baseball, football, tennis, exercising, video-gaming, sight-seeing, shopping, event viewing, or commuting.

17. The device of claim 8, wherein the processor is further configured to:

provide an activity boosting factor in the document index, wherein particular search results based on search strings including at least one activity keyword associated with a present activity are increased in relevance based on the activity boosting factor.

18. The device of claim 8, wherein the processor is further configured to:

provide the document index to a search server on a predetermined schedule, wherein the predetermined schedule is based on at least one of a predetermined interval and a predetermined threshold of updated index entries.

19. The computer-implemented method of claim 1, wherein receiving the activity identifier further comprises:

receiving a particular activity identifier that is generated based on motion detected by the user device.

20. The computer-implemented method of claim 1, wherein receiving the activity identifier further comprises:

receiving a particular activity identifier that is generated based on a global positioning system (GPS) location of the user device.

* * * * *